(12) United States Patent
Hoffman et al.

(10) Patent No.: US 10,114,510 B2
(45) Date of Patent: Oct. 30, 2018

(54) APPARATUS AND METHOD FOR DETECTING SURFACE SHEAR FORCE ON A DISPLAY DEVICE

(71) Applicant: SAMSUNG DISPLAY CO., LTD., Yongin, Gyeonggi-Do (KR)

(72) Inventors: David M. Hoffman, Fremont, CA (US); Jennifer J. Galela, San Carlos, CA (US); Jiuzhi Xue, Broomfield, CO (US)

(73) Assignee: Samsung Display Co., Ltd., Yongin-si (KR)

( * ) Notice: Subject to any disclaimer, the term of this patent is extended or adjusted under 35 U.S.C. 154(b) by 711 days.

(21) Appl. No.: 14/562,627

(22) Filed: Dec. 5, 2014

(65) Prior Publication Data
US 2015/0177909 A1    Jun. 25, 2015

Related U.S. Application Data

(60) Provisional application No. 61/920,399, filed on Dec. 23, 2013.

(51) Int. Cl.
*G06F 3/042* (2006.01)

(52) U.S. Cl.
CPC ............ *G06F 3/0421* (2013.01); *G06F 3/042* (2013.01)

(58) Field of Classification Search
None
See application file for complete search history.

(56) References Cited

U.S. PATENT DOCUMENTS

| | | | |
|---|---|---|---|
| 2008/0029691 A1* | 2/2008 | Han | G06F 3/04883 250/224 |
| 2008/0122803 A1 | 5/2008 | Izadi et al. | |
| 2009/0315989 A1 | 12/2009 | Adelson | |
| 2010/0220269 A1 | 9/2010 | Takama et al. | |
| 2011/0164308 A1 | 7/2011 | Arsenault et al. | |
| 2011/0234535 A1 | 9/2011 | Hung et al. | |

FOREIGN PATENT DOCUMENTS

| | | |
|---|---|---|
| CA | 2 678 414 A1 | 8/2008 |
| CN | 101107587 A | 1/2008 |

(Continued)

OTHER PUBLICATIONS

Internet Website: Chris Harrison / Using Shear for Rich Touch-screen Interaction http://www.chrisharrison.net.index.php/Research/ShearTouch (p. 1 of 1).

(Continued)

*Primary Examiner* — Gustavo Polo
(74) *Attorney, Agent, or Firm* — Lewis Roca Rothgerber Christie LLP (57) ABSTRACT

A display device includes: an optical sensing array to detect light; a backlight to emit light toward a surface of the display device; and a thin optical film layer at the surface of the display device, the thin optical film layer being configured to, while a first shear force is being applied at a first point of contact at the surface of the display device, reflect light having a first wavelength at a front area ahead of the first point of contact in a direction of the first shear force, and reflect light having a second wavelength at a back area behind the first point of contact opposite the front area, the first wavelength being different from the second wavelength.

18 Claims, 5 Drawing Sheets

(56) References Cited

FOREIGN PATENT DOCUMENTS

| CN | 101819491 A | 9/2010 |
|---|---|---|
| CN | 102707841 A | 10/2012 |
| EP | 2 224 319 A2 | 9/2010 |
| JP | 2010-002563 A | 1/2010 |
| JP | 2012-58714 A | 3/2012 |
| KR | 10-2011-0041331 A | 4/2011 |
| WO | WO 2006/075267 A2 | 7/2006 |
| WO | WO 2011/128266 A1 | 10/2011 |

OTHER PUBLICATIONS

Internet Website: Tactonic Technologies, LLC; The Future of Pressure Imaging: Arbitrarily Large Format, Seamless, Cost Effective http://www.tactonic.com/about.html (p. 1 of 1).

Cho, et al., Nano-Si Optical Pixel-Sensor Array using TFT Technology as Image-Scan/Fingerprint Panel; AU Optronics Technology Center, P-23 / A.T. Cho, SID 2013 Digest (pp. 1066-1069).

EPO Search Report dated Aug. 19, 2015, for corresponding European Patent application 14199623.1, (14 pages).

Uchiyama, A., et al., *Copolycarbonate optical films developed using birefringence dispersion control*, Polymer Journel, vol. 44, No. 10, May 9, 2012, pp. 995-1008, XP 55207544.

EPO Search Report dated May 28, 2015, for corresponding European Patent application 14199623.1, (7 pages).

Arsenault, A.C., et al., *From colour fingerprinting to the control of photoluminescence in elastic photonic crystals*, Nature Materials, vol. 5, No. 3, Mar. 1, 2006, pp. 179-184, XP 002483777.

Tang, Bui, Thanh, et al., *Investigation of strain sensing effect in modified single-defect photonic crystal nanocavity*, Optics Express, vol. 9, No. 9, Apr. 25, 2011, pp. 8821-8829, XP 55190234.

\* cited by examiner

APPARATUS AND METHOD FOR DETECTING SURFACE SHEAR FORCE ON A DISPLAY DEVICE

CROSS-REFERENCE TO RELATED APPLICATION

The present application claims priority to and the benefit of U.S. Provisional Application Ser. No. 61/920,399, filed Dec. 23, 2013, entitled "TECHNIQUE FOR OPTICALLY SENSING THE SURFACE SHEAR FORCE OF A TOUCH SCREEN" the entire content of which is incorporated herein by reference.

BACKGROUND

Embodiments of the present invention relate to an apparatus and method for detecting surface shear force on a display device.

Display devices have become increasingly popular, and are widely used, such as in cell phones, computer monitors, televisions, tablets, etc. These display devices may be any type of display, including an organic light emitting device (OLED) display, a liquid crystal display (LCD), etc. In particular, display devices including optical sensors have been developed, for example, to detect a user's interaction with the display device (e.g., an interaction with the display device via the user's finger or via use of a stylus).

However, although display devices with integrated optical sensors are able to detect a position of a user interaction (e.g., a user's touch), display devices have been limited in the ability to detect force of a touch interaction by the user. In particular, display devices are largely unable to detect a shear force (or shearing force) exerted by a user upon the display device. An example of a shear force interaction with a display device could be when a user applies downward pressure with the user's finger at a point on the display device and, while maintaining the position and the downward force of the finger, applies a horizontal force in any direction along the surface of the display device. In cases in which the horizontal (shear) force is less than that of the frictional force, the finger will not move, which would be an isometric gesture or isometric shear force. When the horizontal (shear) force exceeds the frictional force, there is a shear force and movement, such as a hard drag.

A display device capable of sensing a user's shear force upon the device may expand the breadth of interaction between a user and the display.

SUMMARY

Aspects of embodiments of the present invention are directed toward a display device that is capable of sensing a shear force interaction with the display device by a user.

According to some embodiments of the present invention, a display device may have an increased capability of sensing various user gestures, particularly when such user gestures manifest themselves in a detectable shear to the display device.

According to an embodiment of the present invention, there is provided a display device including: an optical sensing array to detect light; a backlight to emit light toward a surface of the display device; and a thin optical film layer at the surface of the display device, the thin optical film layer being configured to, while a first shear force is being applied at a first point of contact at the surface of the display device, reflect light having a first wavelength at a front area ahead of the first point of contact in a direction of the first shear force, and reflect light having a second wavelength at a back area behind the first point of contact opposite the front area, the first wavelength being different from the second wavelength.

The first and second wavelengths may be spectral distributions corresponding to different bands of infrared light The thin optical film layer may include a deformable surface adapted to thicken in the direction of the first shear force and thin in a direction opposite the direction of the first shear force.

The first wavelength may be greater than the second wavelength.

The thin optical film layer may include a photonic crystal layer adapted to compress in the direction of the first shear force and stretch in a direction opposite the direction of the first shear force.

The first wavelength may be less than the second wavelength.

The photonic crystal layer may include a polymer with embedded voids.

The photonic crystal layer may include polymer-based opals.

The display device may be configured to measure the first shear force at the first point of contact concurrently with a second shear force at a second point of contact by detecting a first spectral shift of light reflected from the thin optical film layer at the first point of contact and a second spectral shift of light reflected from the thin optical film layer at the second point of contact.

According to another embodiment of the present invention, a method for sensing a shear force at a surface of a display device including an optical sensing array to detect light, a backlight to emit light toward a surface of the display device, and a thin optical film layer at the surface of the display device, the method including: detecting a first point of contact at the surface of the display device; reflecting by the thin optical film layer, while a first shear force is being applied at the first point of contact at the surface of the display device, light having a first wavelength at a front area ahead of the first point of contact in a direction of the first shear force; reflecting by the thin optical film layer, while the first shear force is being applied, light having a second wavelength at a back area behind the first point of contact opposite the front area, the second wavelength being different from the first wavelength; and sensing by the optical sensing array the reflected light having the first and second wavelengths.

The first and second wavelengths may be wavelengths corresponding to infrared light.

The first wavelength may be greater than the second wavelength.

The thin optical film layer may include a deformable surface adapted to thicken in the direction of the first shear force and thin in a direction opposite the direction of the first shear force, and an anti-reflective film for visible light on the deformable surface.

The thin optical film layer may include a photonic crystal layer adapted to compress in the direction of the first shear force and stretch in a direction opposite the direction of the first shear force.

The photonic crystal layer may include a polymer with embedded voids.

The photonic crystal layer may include polymer-based opals.

The method may further include measuring the first shear force at the first point of contact concurrently with a second shear force at a second point of contact by detecting a first spectral shift of light reflected from the thin optical film layer at the first point of contact and a second spectral shift of light reflected from the thin optical film layer at the second point of contact.

According to another embodiment of the present invention, a display device includes: a backlight to emit light; a lower linear polarizer on the backlight; an upper linear polarizer on the lower linear polarizer; a liquid crystal display between the lower and upper linear polarizers; and an optical sensing array to detect light reflection asymmetry at the liquid crystal display while a shear force is being applied at a surface of the display device.

The display device may further include a birefringent material layer on the liquid crystal display, and the birefringent material layer may be between the lower and upper linear polarizers.

The display device may further include an infrared waveguide front light on the upper linear polarizer.

The display device may further include an optical layer on the liquid crystal display, and the optical sensing array may include a plurality of sensors configured to be sensitive to detect a physical change to the optical layer due to a touch input.

The plurality of sensors may include: a first sensor sensitive to a first peak wavelength; and a second sensor sensitive to a second peak wavelength.

The display device may further include: a first filter aligned with the first sensor, and the first filter may be configured to pass a first wavelength band including the first peak wavelength; and a second filter aligned with the second sensor, and the second filter may be configured to pass a second wavelength band including the second peak wavelength.

The plurality of sensors may be sensitive to detect a wavelength that is shifted, by a predetermined amount, with respect to a quiescent state wavelength of light reflected without a touch input.

BRIEF DESCRIPTION OF THE DRAWINGS

The above and other aspects of embodiments of the present invention will become more apparent by describing in detail example embodiments thereof with reference to the accompanying drawings, in which.

DETAILED DESCRIPTION

Hereinafter, embodiments of the present invention will be described more fully with reference to the accompanying drawings, in which, example embodiments of the present invention are shown. As those skilled in the art would realize, the described embodiments are susceptible to various modifications and alternative forms without departing from the spirit or scope of the present invention. For clarity of the description of the present invention, some elements or features not required for the complete understanding of the present invention may be omitted.

The terms used in the present specification are used to describe particular embodiments, and are not intended to limit the present invention. For example, it will be understood that, although the terms "first," "second," etc. may be used herein to describe various elements, these elements would not be limited by the strict construction of these terms. Instead, these terms are used only to distinguish one component from another. Further, an expression used in the singular encompasses the expression of the plural, unless it has a clearly different meaning in the context. In the present specification, it is to be understood that the terms such as "comprising," "including," "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that when an element or layer is referred to as being "on," "connected to," or "coupled to" another element or layer, it can be directly on, connected to, or coupled to the other element or layer, or one or more intervening elements or layers may also be present. Similarly, when an element or layer is referred to as being "connected at" or "coupled at" another element or layer, the element or layer may be directly or indirectly "connected at" or "coupled at" said another element or layer. When an element is referred to as being "directly on," "directly connected to," "directly coupled to," "directly connected at," or "directly coupled at" another element or layer, there are no intervening elements or layers present. Like numbers refer to like elements throughout. As used herein, the term "and/or" includes any and all combinations of one or more of the associated listed items.

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Further, when describing embodiments of the present invention, the use of "may" relates to "one or more embodiments of the present invention."

Like reference numerals in the drawings denote like elements, and repeated descriptions thereof may be omitted.

According to embodiments of the present invention, a display device is capable of changing properties at its surface in response to a user interaction with the display device (e.g., when a user touches the display). The change of the display device in response to a user interaction creates augmented optical properties deviating from the normal optical properties of an untouched display at the point of contact. The changed optical properties (e.g., optical birefringence, material thickness, or both) of the display device at its surface indicate the pressure and the shear forces at the point of contact. According to embodiments, the optical changes in the light reflectance or interference are detected by light sensors embedded in the display device so as to discern the direction and magnitude of the forces at the touched surface.

Reflected light may be detected, for example, using an array of sensors with bandpass selectivity included within light sensors embedded in the display device. In one embodiment, the array contains two types of sensors each having sensitivity to a different wavelength of near infrared light (e.g., are sensitive to detect a different and relatively narrow bandwidth of IR light). Such sensitivity differences could be achieved, for example, by using sensors in combination with two narrow band IR pass filters. Alternatively, the sensors could be based on quantum dots tuned to have a different dot size to achieve different wavelength selectivity and with proper cutoff filters. Alternatively, the sensors could be based on Transverse or Conventional Fabry Perot resonators with their size tuned to achieve different resonant frequencies.

The detector could also achieve greater shear direction and magnitude discrimination by including greater than two types of bandpass sensors in the array.

In another embodiment making use of only an array of detectors with the same wavelength tuning, the tuned wavelength may be shifted from the nominal wavelength (e.g. slightly longer wavelength). A shear force may result in a shift of the nominal wavelength towards longer wavelength in reflected light at the front of shear contact, and sensors may detect an increase in reflected light intensity, and a shift of the nominal wavelength towards the shorter wavelength at the back of the shear contact point that may cause the sensors to detect lower reflected light intensity as the sensor is less sensitive to light outside its peak sensitivity.

As such, embodiments of the present invention may be included in any suitable display device having means for detecting light (e.g., a display device including light sensors) as known to those have ordinary skill in the art.

Because embodiments of the present invention are capable of sensing shear forces at a surface of a display device, numerous new features and applications may be realized. For example, any position on a touch screen of the display device can control, via user isometric movements causing shear forces on the display device, a virtual pointer on the display similar to how a TrackPoint® controls a pointer on a computer. Similarly, as another example, detectability of shear forces can be utilized to implement a virtual joystick. Alternatively, or in addition to pointing, the shear sensing capabilities of the present invention may be utilized to indicate a "drag" analogous to moving a computer mouse with one of the buttons held down.

In some embodiments, these applications may be utilized, for example, in the context of small display devices having limited screen areas (e.g., smart watches). Furthermore, because isometric movements of a user tend to be more finely controlled, the control of the pointer may be more precise. However, embodiments of the present invention are not limited to single-point gestures, as multi-point isometric gestures may also be detected, which will be described in more detail below.

Figure 1A:
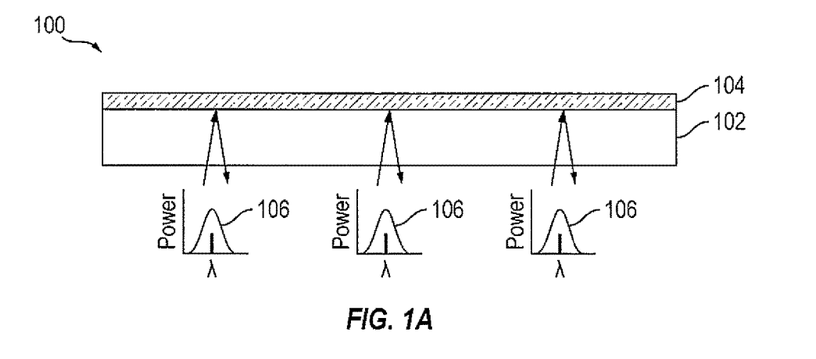
FIG. 1A is a cross-sectional view of a surface of a display device including a deformable optical thin layer in an undisturbed state according to an embodiment of the present invention.

FIG. 1A is a cross-sectional view of a surface of a display device including a thin film reflective layer (e.g., a deformable optical thin layer) in an undisturbed state according to an embodiment of the present invention.

Referring to FIG. 1A, a display device 100 includes a display surface 102 and an optical thin film layer (e.g., a deformable optical thin film layer, a deformable wavelength specific reflective layer, or an anti-reflective film for visible light) 104 on the display surface 102. FIG. 1A illustrates a display device 100 that is in its default state, that is, display device 100 is in a state where there is no user interaction with the surface of the display device 100. As shown, the optical thin film layer 104 has a uniform thickness throughout and has reflectance characteristics tuned for a particular wavelength ($\lambda$) 106 of light while the display device 100 is in the untouched state. Display devices according to embodiments of the present invention may generate light from under the display surface 102 such that light is emitted through the display surface 102 and such that the light reaches the optical thin film layer 104.

Additionally, the optical thin film layer 104 may be engineered such that light having particular wavelengths $\lambda$ is reflected back towards the light source and to an optical sensing array within the display device 100.

According to other embodiments of the present invention, the optical thin film layer may be deformable in itself, and accordingly the deformable surface is inherent in the optical thin film layer. The optical thin film layer may therefore be an anti-reflective coating with a soft or deformable structure (e.g., a polymer coating) according to some embodiments of the present invention.

Furthermore, the optical thin film layer may be a reflective material that normally reflects near infrared light but transmits visible light and that has changing IR reflective properties in relation to the thickness of the optical thin film layer material. In other words, the thickness of the optical thin film layer material may be directly related to the wavelength reflectance properties of the optical thin film layer material. According to embodiments of the present invention, a thicker optical thin film layer may reflect light having longer wavelengths, while a thinner optical thin film layer may reflect light having shorter wavelengths.

The optical thin film layer 104 including an IR reflective material may utilize an interference configuration such that a peak reflectance is achieved at a wavelength in which a first reflection (e.g., from a lower surface of the optical thin film layer 104 adjacent the display surface 102) and a second reflection (e.g., from an upper surface of the optical thin film layer 104 opposite the lower surface) add constructively to have a strong reflectance at the particular wavelength. When the peak reflectance occurs in the infrared spectrum, the optical thin film layer 104 may operate as a hot mirror that is optically transparent to visible light yet exhibits a strong reflection in a narrow band of IR light.

As such, the optical thin film layer 104 including a reflective material may be tuned to reflect light having any suitable or desired wavelength λ back to an optical sensing array in its untouched state. For example, the optical thin film layer 104 may be tuned to reflect light having wavelengths corresponding to a narrow bandwidth of infrared (IR) light corresponding to a bandwidth of light detectable by an embedded optical sensing array.

According to other embodiments of the present invention, the optical thin film layer 104 may be an anti-reflective layer for the visible light (e.g., in which the first and second reflection add out of phase for destructive combination). Such thin optical layers may reflect a broad band of near infrared light (as well as a broad band of deep blue or ultraviolet light). The optical reflection property including its spectral response may shift under pressure due to deformation to the optical layer, and the reflected light with spectral information is detected by the embedded optical sensing array.

Figure 1B:
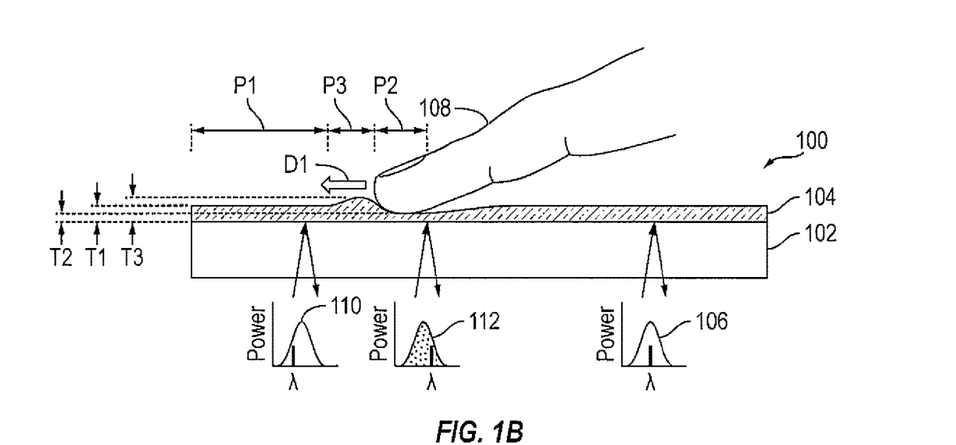
FIG. 1B is a cross-sectional view of the surface of the display device shown in FIG. 1A undergoing a shear force according to an embodiment of the present invention.

FIG. 1B is a cross-sectional view of the surface of the display device shown in FIG. 1A undergoing a shear force according to an embodiment of the present invention.

Referring to FIG. 1B, a user finger 108 applies a forward shear force against the display device 100, thereby causing a deformation of the optical thin film layer 104.

In the present embodiment, the optical thin film layer 104 is a reflective thin film that is positioned on top of the display surface 102 of the touch screen of the display device 100. According to the present embodiment, when a finger of a user applies shear force to the optical thin film layer 104, a thickening of the optical thin film layer 104 occurs in the direction of the shear force (e.g., at a front area ahead of a point of contact), and a thinning of the optical thin film layer 104 occurs in the opposite direction of the shear force (e.g., at a back area behind the point of contact).

Accordingly, when a contact is made with the optical thin film layer 104 and a downward pressure is applied along with a lateral force or pressure in a direction D1, a thickness T1 of the optical thin film layer 104 at a relaxed portion P1 of the optical thin film layer 104 that is away from the touch point portion P2 may be greater than a thickness T2 of the optical thin film layer 104 at the touch point portion P2. Further, a portion P3 of the optical thin film layer 104 adjacent the touch point portion P2 and between the relaxed portion P1 and the touch point portion P2 may have a thickness T3 greater than the thickness T1 of the relaxed portion P1.

The difference in the thickness of the optical thin film layer 104 creates differences in the power spectrum of the reflection (or a differential peak reflectance between the thin and thick areas of the optical thin film layer 104). As shown in FIG. 1B, the relatively thick area of the optical thin film layer 104 reflects light having a particular wavelength 110 and the relatively thin area of the optical thin film layer 104 reflects light having another wavelength 112 that is different than that which the relatively thick area reflects (i.e., light having wavelength 110). Furthermore, both the relatively thick and the relatively thin areas of the optical thin film layer 104 reflect light having different wavelengths than the optical thin film layer 104 having a default thickness does. FIG. 1A shows the default thickness of the optical thin film layer 104 reflecting light having the default wavelength 106 uniformly across the display surface 102. FIG. 1B also illustrates the default reflectance at an area where the optical thin film layer 104 is not significantly disturbed (e.g., at a relaxed portion P1 of the optical thin film layer 104 away from the touch point portion P2).

According to embodiments of the present invention, in a sampled optical image of reflective data taken while a shear force is exerted, the fingertip would be strongly visible as a large reflection at many wavelengths, and the regions in front of and behind the finger would have a distinctive reflection spectra, and as such, the sign, orientation, and magnitude of these reflections may indicate the direction and magnitude of the shear force. Accordingly, by having the display device 100 interpret the different spectra of the reflections (e.g., by optical sensors within the display device 100), the display device 100 can discern the direction of a shear force exerted by a user upon the display device 100. Further disclosure regarding optical imaging of a surface of a display device while a shear force is exerted on the display device is discussed below in conjunction with FIGS. 3A-3D.

Figure 2A:
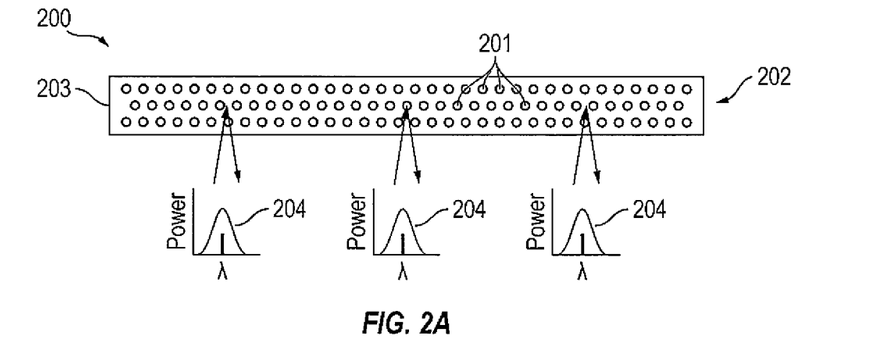
FIG. 2A is a cross-sectional view of a surface of a display device including a photonic crystal layer in an undisturbed state according to an embodiment of the present invention.

FIG. 2A is a cross-sectional view of a surface of a display device including a photonic crystal layer in an undisturbed state according to an embodiment of the present invention.

Referring to FIG. 2A, a display device 200 includes a photonic crystal layer 202 including a plurality of objects or voids 201, having one refractive index, embedded within a bulk material 203, having a different refractive index, at a surface of the display device 200. The objects 201 are periodic nanostructures in the bulk material 203 whose sub-wavelength features interact with narrow bands of light and may be highly sensitive to deformation. Such deformation may be elastic if the applied pressure is within an elastic deformation limit. During deformation of the photonic crystal layer 202, the density of these photonic crystal nanostructures and the structure of the individual crystals can change, thereby changing the wavelengths of light that they reflect.

According to some embodiments of the present invention, the photonic crystal layer 202 may include any suitable photonic crystal material such as a polymer material with embedded voids. When the photonic crystal layer 202 is compressed, higher energy photons such as near IR (e.g., 800 nm) light may be reflected at or near the point of compression. When the photonic crystal layer 202 is stretched, lower energy light such as deeper IR (e.g., 900 nm) light may be reflected at or near the point of stretching. The photonic crystal layer 202 or bulk material 203 may be manufactured using any suitable manufacturing method such as roll-to-roll manufacturing on substrates such as plastic films like polyethylene terephthalate (PET), or other suitable flexible and/or stretchable substrate materials. In some embodiments, the total thickness of the photonic crystal layer may be less than about 0.1 mm thick.

In other embodiments of the present invention, the photonic crystal layer 202 may be made from synthetic rubbers, which can be stretched and squeezed or compressed, resulting in dramatic changes in peak wavelength of the reflection. The periodic nanostructures 201 of the photonic crystal layer 202 may be polymer-based opals with optical responses to a variety of external triggers (e.g., compression and stretching). In some embodiments, the photonic crystal opals may optically respond to mechanical stress with a shift in the IR wavelengths so that there is negligible optical impact on the visible light images being displayed by the display device.

FIG. 2A illustrates a display device 200 in its default state. That is, display device 200 is in a state where there is no user interaction with the surface of the display device 200. As shown in FIG. 2A, the photonic crystal layer 202 has a uniform thickness throughout and is tuned to have a strong reflectance for light having a particular wavelength (λ) 204 while the display device 200 is in the untouched state. Display devices according to this embodiment of the present invention may generate light from under the photonic crystal layer 202 such that light is emitted through the photonic crystal layer 202 towards the user. Additionally, the periodic nanostructures 201 are engineered such that light having particular wavelengths λ are reflected back towards the light source (e.g., towards an optical sensing array).

The periodic nanostructures 201 may be tuned to reflect light having any suitable wavelength λ in its untouched state. For example, the periodic nanostructures 201 may be tuned to reflect light having wavelengths corresponding to infrared (IR) light (e.g., light having wavelengths in a range from about 750 nm to 1000 nm).

Figure 2B:
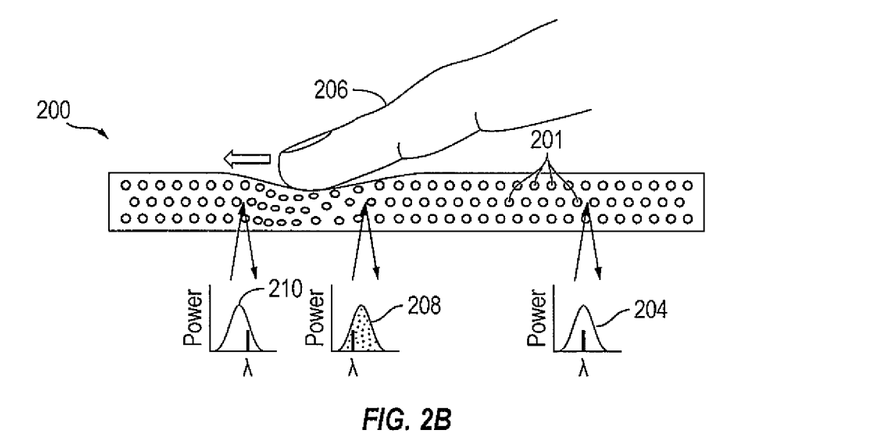
FIG. 2B illustrates a cross-sectional view of the surface of the display device shown in FIG. 2A undergoing a forward shear force according to an embodiment of the present invention.
Figure 2C:
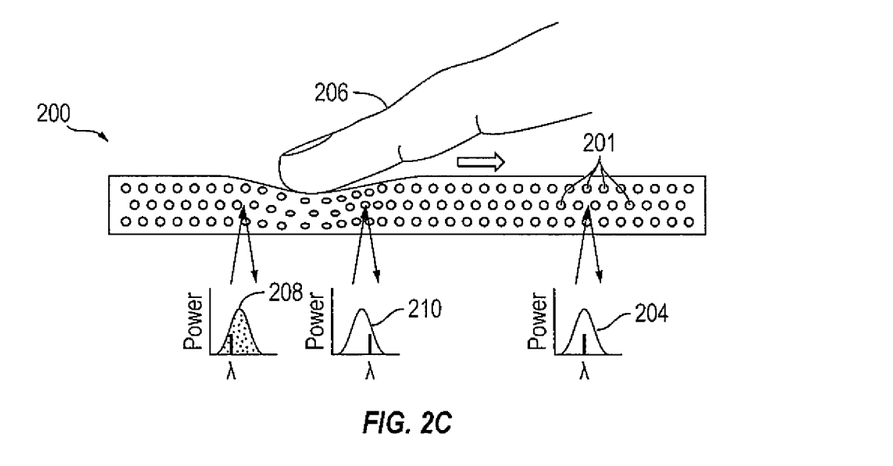
FIG. 2C illustrates a cross-sectional view of the surface of the display device shown in FIG. 2A undergoing a backwards shear force according to an embodiment of the present invention.

FIG. 2B illustrates a cross-sectional view of the surface of the display device shown in FIG. 2A undergoing a forward shear force according to an embodiment of the present invention. FIG. 2C illustrates a cross-sectional view of the surface of the display device shown in FIG. 2A undergoing a backwards shear force according to an embodiment of the present invention.

Referring to FIG. 2B, a user finger 206 applies a forward shear force against the surface of the display device 200 causing a deformation of the bulk material 203 and a compression of the periodic nanostructures 201 at the photonic crystal layer 202 at a front area ahead of the point of contact in the direction of the shear force, such that the periodic nano structure 201 are more densely arranged or are compressed in front of the point of the contact. The shear force further causes a stretched region of periodic nanostructures 201, in at a back area behind the point of contact in a direction opposite to the shear force, such that the periodic nanostructures 201 are less densely arranged or are stretched behind the point of contact. Referring to FIG. 2C, a user finger 206 applies a backward shear force against the surface of the display device 200 causing a deformation of the bulk material 203 and an aggregation of the objects or periodic nanostructures 201 at the photonic crystal layer 202 at a front area ahead of the point of contact in the direction of the shear force, and causing a relatively sparse region of periodic nanostructures 201 at a back area behind the point of contact in a direction opposite to the shear force.

In the present embodiment, the periodic nanostructures 201 are embedded within the bulk material 203 to form the photonic crystal layer 202 that is positioned at the surface of the display device 200. According to the present embodiment, when a finger of a user applies shear force to the photonic crystal layer 202, an area of increased density of the periodic nanostructures 201 is caused in the direction of the force (e.g., in front of the touch position relative to the direction of the force), and an area of decreased density of the periodic nanostructures 201 is caused in the opposite direction of the force (e.g., behind the touch position relative to the direction of the force). Additionally, the periodic nanostructures 201 themselves compress when undergoing pressure from the user finger 206. Thus, there may be a measurable asymmetry in the reflectance from the photonic crystal layer 202 around the point of contact. In addition to the compression taking place under the finger 206, the stretching and compression of the bulk material 203, causing reallocation of periodic nanostructures 201 around the point of contact, can indicate the direction and magnitude of the shear force.

At the point of contact, the stretching and compression of the photonic crystal layer 202 creates differences in the power spectrum of the reflection (e.g., a differential peak reflectance between the stretched and compressed areas occurs at the point of contact). As shown in FIGS. 2B and 2C, the area with increased density of periodic nanostructures 201 of the photonic crystal layer 202 reflects light having a particular wavelength 210 and the area with decreased density of periodic nanostructures 201 of the photonic crystal layer 202 reflects light having another wavelength 208 that is different than the reflectance of the light having wavelength 210. Furthermore, both the increased density and decreased density areas of the periodic nanostructures 201 of the photonic crystal layer 202 reflect different wavelengths of light than the photonic crystal layer 202 having a default thickness does. FIG. 2A shows the default thickness of the photonic crystal layer 202 reflecting light having default wavelength 204. FIGS. 2B and 2C also illustrate the default reflectance at an area where the photonic crystal layer 202 is not significantly disturbed (e.g., at an area away from the user's finger).

According to embodiments of the present invention, in the sampled spatial array of reflective data, the fingertip would be strongly visible as a large reflection at many wavelengths, and the regions in front and behind the finger would have a distinctive reflection spectra, and as such, the sign, orientation, and magnitude of these specular reflections indicate the direction and magnitude of the shear force. Accordingly, by having the display device 200 interpret the differential degrees of reflection (e.g., by optical sensors within the display device 200), the display device 200 can discern the direction of a shear force exerted by the user upon the display device 200.

The embodiments of the present invention shown in FIGS. 1A and 2A provide a display device capable of sensing shear forces with negligible visual interference using existing optical sensing display devices. These embodiments can be realized by adding a single extra layer to the display device (e.g., a soft anti-reflective layer for visible light or a photonic crystal layer). Moreover, the extra layer may be affixed to the outermost layer of the display device as an optional addition to the display device after manufacturing of the display device. Additionally, these embodiments may be engineered to have a negligible impact on the brightness and the optical quality of the display, as, in some embodiments, the extra layers may be tuned to impact light in a targeted IR band and to not attenuate or distort the visible light leaving the display.

The embodiments of the present invention shown in FIGS. 1A and 2A create images with distinctive optical signatures that indicate the direction of the shear forces. In some embodiments, by tuning the optical thin film layer (e.g., reflective film) or the photonic crystals, the optical signature can be seen in IR light (e.g., an area in front of the point of contact in the direction of the shear force may have peak reflectance at a first tuned or predetermined wavelength of light, such as 800 nm, and another area behind the point of contact may have peak reflectance at a second tuned or predetermined wavelength of light, such as 900 nm. An area corresponding to the finger touch position indicates a broadband reflection by the finger, whereas the stretched and compressed areas of the material surrounding the broadband reflection area have optically distinct reflectance properties from each other. Accordingly various gestures that do not require motion (i.e., isometric gestures) can be interpreted. Although, embodiments of the present invention have been described as reflecting IR light, they may be tuned to reflect light having any suitable wavelength as desired.

Figure 3A:
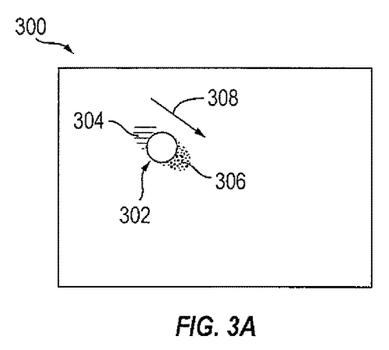
FIG. 3A illustrates a sensed optical image of the lateral surfaces of the display devices shown in FIGS. 1A and 2A undergoing a directional shear force according to an embodiment of the present invention.

FIG. 3A illustrates a sensed optical image of the lateral surfaces of the display devices shown in FIGS. 1A and 2A undergoing a directional shear force according to an embodiment of the present invention.

Referring to FIG. 3A, the sensed optical image 300 in response to a shear force 308 exerted on a display device by a user includes point of contact 302, a back area 304 adjacent and behind the point of contact 302 and opposite to the direction of shear force 308, and a front area 306 adjacent and in front of the point of contact 302 corresponding to the direction of the shear force 308.

In response to the shear force 308, deformation of the surface of the display device occurs as described above in connection with FIGS. 1A-2C. The deformation, due to, for example, the existence of a deformable IR reflective layer or a photonic crystal layer, causes the back area 304 and the front area 306 to exhibit different respective optical signatures. In some embodiments, the back area 304 may reflect light having a first wavelength (e.g., 800 nm) or wavelength band, and the front area 306 may reflect light having a second wavelength (e.g., greater than the first wavelength, for example, 900 nm) or wavelength band. For example, in some embodiments, in which a display device includes a deformable optical thin layer, the back area 304 behind the point of contact 302 may reflect light having a wavelength that is less than a wavelength of light reflected at the front area 306 in front of the point of contact 302. In other embodiments, for example, in which a display device includes a photonic crystal layer, the back area 304 behind the point of contact 302 may reflect light having a wavelength that is less than or greater than a wavelength of light reflected at the front area 306, depending on the orientation of the photonic crystal layer relative to the direction of the reflected light.

Thus, according to embodiments of the present invention, an optical sensing apparatus in a display device may operate to detect the reflectance of light having specific wavelengths (or wavelength bands) in order to detect the direction of shear forces, which occurs from the back area 304 to the front area 306. That is, the first and second wavelengths may be spectral distributions corresponding to different bands of infrared light. For example, when sensing 800 nm light and 900 nm light, a display device can detect a shear force in a direction from the area corresponding to the 800 nm light to the area corresponding to the 900 nm light. According to other embodiments of the present invention, the display device is tuned to reflect light having other wavelengths (e.g., light having other wavelengths of IR).

Additionally, because at the point of contact an area of broadband reflectance occurs corresponding to a user's finger, embodiments of the present invention may also utilize this information to detect shear forces and their direction. For example, in some embodiments of the present invention, a display device may first sense an area of broadband reflectance and, if the area is present, detect whether or not light of different wavelengths are present around the area of broadband reflectance.

Figure 3B:
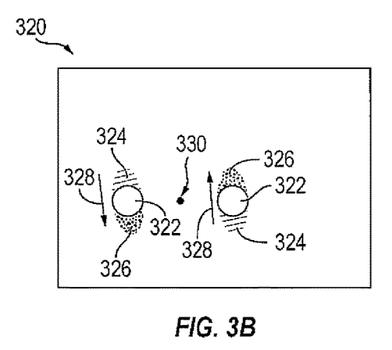
FIG. 3B illustrates a sensed optical image of the lateral surfaces of display devices shown in FIGS. 1A and 2A undergoing a multi-touch shear force according to an embodiment of the present invention.

FIG. 3B illustrates a sensed optical image of the lateral surfaces of the display devices shown in FIGS. 1A and 2A undergoing a multi-touch shear force according to an embodiment of the present invention.

Referring to FIG. 3B, the sensed optical image 320, in response to two concurrent shear forces 328 exerted by a user on a display device, includes two points of contact 322, a back area 324 adjacent and behind each point of contact 322 and opposite to the direction of each respective shear force 328, a front area 326 adjacent and in front of each point of contact 322 corresponding to the direction of each respective shear force 328, and a central point 330 located between the two points of contact 322. According to the present embodiment, a user performs a gesture wherein one point of contact 322 corresponds to an upward shear force and the other point of contact 322 corresponds to a downward shear force, both shear forces occurring around and in relation to the control point 330. Accordingly, a display device can detect this gesture and perform, for example, a rotation action on the display screen in response to the gesture.

Figure 3C:
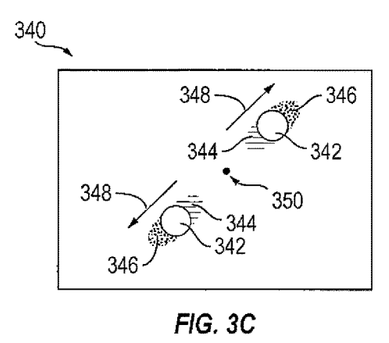
FIG. 3C illustrates a sensed optical image of the lateral surfaces of the display devices shown in FIGS. 1A and 2A undergoing another multi-touch shear force according to an embodiment of the present invention.

FIG. 3C illustrates a sensed optical image of the lateral surfaces of the display devices shown in FIGS. 1A and 2A undergoing another multi-touch shear force according to an embodiment of the present invention.

Referring to FIG. 3C, the sensed optical image 340 in response to two concurrent shear forces 348 exerted by a user on a display device includes two points of contact 342, a back area 344 adjacent and behind each point of contact 342 and opposite to the direction of each respective shear force 348, a front area 346 adjacent and in front of each point of contact 342 corresponding to the direction of each respective shear force 348, and a central point 350 located between the two points of contact 342. According to the present embodiment, a user performs a gesture wherein the two points of contact 342 correspond to outward shear forces with respect to the central point 350. Accordingly, a display device can detect this isometric stretch gesture and perform, for example, a "zoom in" action on the display screen in response to the gesture.

Figure 3D:
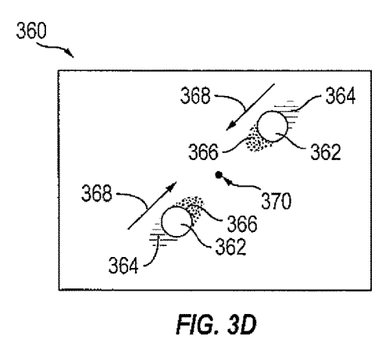
FIG. 3D illustrates a sensed optical image of the lateral surfaces of the display devices shown in FIGS. 1A and 2A undergoing yet another multi-touch shear force according to an embodiment of the present invention.

FIG. 3D illustrates a sensed optical image of the lateral surfaces of the display devices shown in FIGS. 1A and 2A undergoing yet another multi-touch shear force according to an embodiment of the present invention.

Referring to FIG. 3D, the sensed optical image 360 in response to two concurrent shear forces 368 exerted by a user on a display device includes two points of contact 362, a back area 364 adjacent and behind each point of contact 362 and opposite to the direction of each respective shear force 368, a front area 366 adjacent and in front of each point of contact 362 corresponding to the direction of each respective shear force 368, and a central point 370 located between the two points of contact 362. According to the present embodiment, a user performs a gesture wherein the two points of contact 362 correspond to inward shear forces with respect to the central point 370. Accordingly, a display device can detect this isometric pinch gesture and perform, for example, a "zoom out" action on the display screen in response to the gesture.

The gestures shown in FIGS. 3C and 3D (i.e., the isometric stretch gesture and the isometric pinch gesture, respectively) sensed by embodiments of the present invention include opposing shear forces on the display screen, and thus could not be detected by measuring a net shear on the display. As such, embodiments of the present invention provide the capability of detecting multi-finger shear forces, including multi-finger shear forces that result in a zero net shear force on the display.

Moreover, embodiments of the present invention are capable of detecting a hard slide that can be differentiated by a light swipe across the surface of a display device. A hard slide may occur when a user presses on a display with pressure from the user's finger, and the user slides the finger across the display while maintaining the pressure (i.e., a hard slide is a moving force in which the shear force exceeds the frictional force between the display and the object, such as a finger, touching the display such that the object touching the display slides across the surface of the display). In this case, the user interacts with the display by movement of the finger and by exerting shear force on the display while moving the finger. As such, embodiments of the present invention are capable of sensing a hard slide as an optical shear signature translating across the display. According to some embodiments of the present invention, the detection of a hard slide may be utilized to enable, for example, different scroll functionality or various other user experiences with the display device, such as a click and drag gesture or input.

Furthermore, embodiments of the present invention may provide added security to a display device. Because isometric shear force gestures implemented by a user are difficult to discern by a second party observer, embodiments of the present invention may provide the capability of unlocking a display device by utilizing isometric gestures. For example, according to embodiments of the present invention, fingers of a user need not visibly move for the user to enter a combination of isometric shear gestures to unlock a device.

Figure 4:
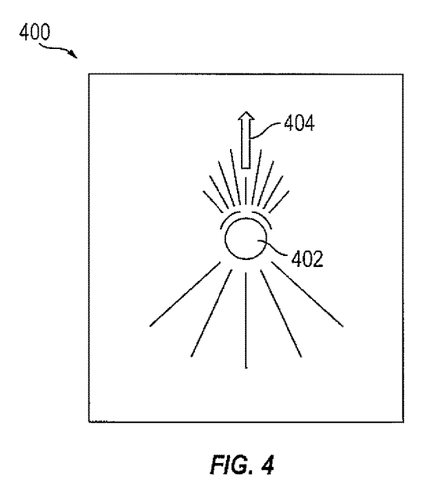
FIG. 4 illustrates a top view of a display device including a birefringent material when a shear force is applied thereto.

FIG. 4 illustrates a top view of a display device including a birefringent material when a shear force is applied thereto.

Many organic materials, such as polyimides mixed with rod or disk-like molecules, exhibit optical birefringence properties and are used as optical compensation films in a liquid crystal display. When stressed, this birefringence can change to create patterns, particularly when placed between polarizers, that are aligned with the axes of the force.

Referring to FIG. 4, a display device 400 includes a birefringent material layer. According to the present embodiment, a user interacts with the display device 400 at a contact point 402 and exerts a shear force 404 on the display device 400. As shown, in response to the shear force 404, the display device 400 exhibits asymmetrical light reflectance around the contact point 402 (e.g., the pattern of reflectance of light in front of the contact point in the direction of the shear force is different from the pattern of reflectance of light behind the contact point). Accordingly, display devices according to embodiments of the present invention can detect these asymmetrical light reflectance patterns associated with contact points to determine the presence and direction of a shear force upon a display. The birefringent material may be any suitable optically birefringent material such as polyethylene, polyethylene terephthalate (PET), or any other suitable plastic exhibiting optical birefringence, such as materials known as A plates or C plates used for broadening the viewing angle of liquid crystal displays.

Figure 5A:
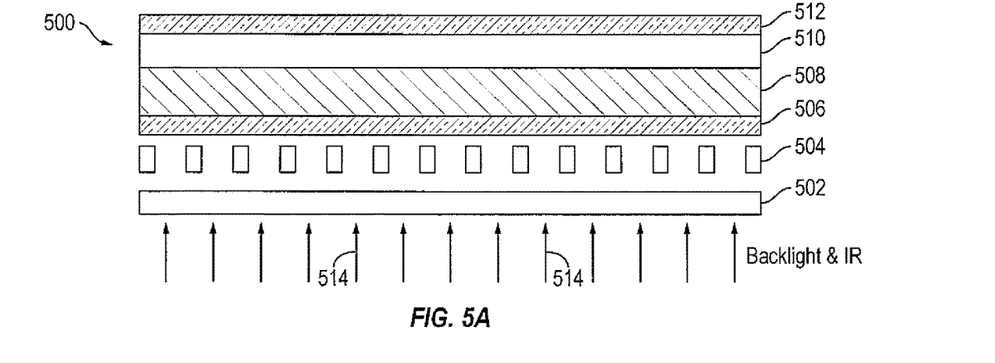
FIG. 5A illustrates a cross-sectional view of a display device including a birefringent layer according to an embodiment of the present invention.

FIG. 5A illustrates a cross-sectional view of a display device including a birefringent layer according to an embodiment of the present invention.

Referring to FIG. 5A, a display device 500 includes a brightness enhancement film 502, an optical sensing array 504 on the brightness enhancement film 502, a first or lower linear polarizer 506 on the optical sensing array 504, a liquid crystal display 508 on the first linear polarizer 506, a birefringent material 510 on the liquid crystal display 508, and a second or upper linear polarizer 512 on the birefringent material 510. According to the present embodiment, the display device 500 is backlit such that the display device 500 emits light, including IR light 514 from under the brightness enhancement film 502 to the outside.

To image the stress pattern in response to a user-exerted shear force, the birefringent material 510 is located between the liquid crystal display 508 and the second linear polarizer 512. According to embodiments of the present invention, the first linear polarizer 506 and the second linear polarizer 512 are arranged orthogonal to each other. In addition to visible light, IR light is also passed through the display device 500 such that the IR light can be reflected off a user's finger. In the present embodiment, the IR light passes through the first linear polarizer 506 and the second linear polarizer 512 twice, first when emitted by the backlight and again when reflected by the user's finger.

As shown in FIG. 4, this reflected IR light passes through an area ahead of the finger and through an area behind the finger at regions where the birefringent material 510 is stressed, thereby creating a pattern of reflectance of the IR light around the point of contact that can be detected by the optical sensing array 504.

According to other embodiments of the present invention the liquid crystal display 508 may be located below the first and second linear polarizers.

Figure 5B:
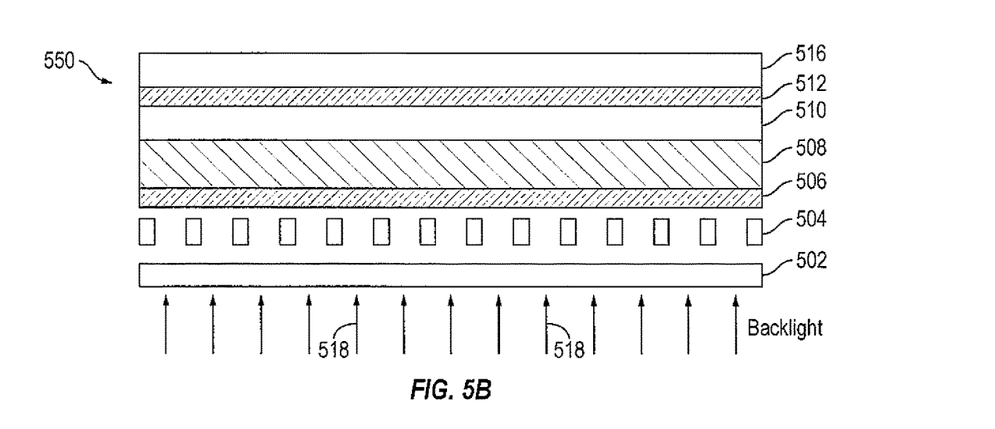
FIG. 5B illustrates a cross-sectional view of a display device including a birefringent layer according to another embodiment of the present invention.

FIG. 5B illustrates a cross-sectional view of a display device including a birefringent layer according to another embodiment of the present invention.

Referring to FIG. 5B, the display device 550 includes layers similar to those of display device 500 shown in FIG. 5A. Accordingly, the description of those elements that are the same as those shown in FIG. 5A may be omitted, and the additions and modifications to the display device 500 shown in FIG. 5A will be described below.

Display device 550 further includes an IR waveguide front light 516. Additionally, because of the addition of the IR waveguide front light 516, back light 518 without IR light is transmitted through the display device 550.

As such, according to the present embodiment, the IR light generated by the IR waveguide front light 516 reflects back from a user's finger and passes through the first linear polarizer 506 and the second linear polarizer 512 in response to the reflection of the IR light by the user's finger. Accordingly, according to the present embodiment, the IR light passes through the first linear polarizer 506 and the second linear polarizer 512 once.

Furthermore, according to embodiments of the present invention, to avoid interference with display images of the display device, the optical shear force sensing may occur at a black frame, in which the display is switched to black, that is inserted between frames of displayed images during normal operation of the display (e.g., inserted between sequential frames).

Although the embodiments shown in FIGS. 5A and 5B are LCDs, embodiments of the present invention may be used in conjunction with any suitable display device, for example, organic light emitting display devices. According to some embodiments, an organic light emitting layer may be inserted below the first linear polarizer.

Figure 5C:
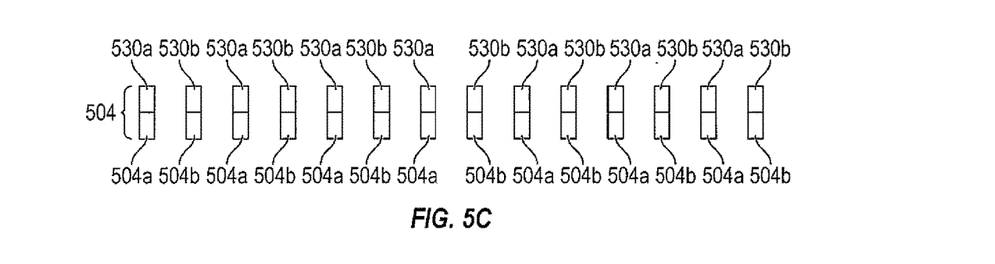
FIG. 5C illustrates a cross-sectional view of an optical sensing array according to an embodiment of the present invention.

FIG. 5C illustrates further details of the optical sensing array 504 shown in FIGS. 5A and 5B, according to some embodiments of the present invention.

As shown in FIG. 5C, the optical sensing array 504 may include, for example, a plurality of first sensors 504a and a plurality of second sensors 504b (e.g., in an alternating arrangement or sequence within the optical sensing array 504, or any other suitable arrangement according to the design of the display device). The first sensors 504a and second sensors 504b may be sensitive to different wavelengths (or different bands of wavelengths) of near infrared light corresponding to the expected peak wavelengths of reflected light depending on whether or not a user applies a shear force to the display panel. That is, the first sensors 504a and the second sensors 504b may be sensitive to detecting different and relatively narrow bandwidths of IR light, respectively.

For example, the first sensors 504a may be sensitive to detecting a peak wavelength or wavelength band corresponding to the expected wavelength of light reflected at an area of the display ahead of a shear force touch input, and the second sensors 504a may be sensitive to detecting a peak wavelength or wavelength band corresponding to the expected wavelength of light reflected at an area of the display behind a shear force touch input. Alternatively, the sensors of the optical sensing array 504 may be sensitive to detecting one wavelength (or wavelength band) that is shifted, by a predetermined amount, off peak with respect to the wavelength of light that is reflected when there is no touch input (e.g., in a quiescent state).

Thus, the optical sensing array 504 may be configured to detect physical changes to optical layers of the display device due to touch input (e.g., shear force) applied to the display device. In order to detect such physical changes to the optical layers, the optical sensing array 504 may include first sensors 504a and second sensors 504b that are sensitive to detect different peak wavelengths or different wavelength bands of light. In some embodiments, the first sensors 504a and the second sensors 504b may be the same type of sensor but may include different narrow band IR pass filters 530a and 530b included or aligned with the first sensors 504a and second sensors 504b, respectively, that are configured to transmit different IR bands corresponding to expected peak wavelengths of reflected light depending on whether or not a shear force is applied to the display panel, as discussed above. In some embodiments, the filters 530a and 530b may be integrated with the sensors 504a and 504b, respectively. Alternatively, the filters 530a and 530b may be formed or positioned as one or more separate layers above the optical sensing array 504, and aligned with corresponding ones of the first sensors 504a and the second sensors 504b.

In another embodiment, the first sensors 504a and second sensors 504b may include quantum dot based sensors tuned to have a different dot size, respectively, and the different quantum dot based sensors may each utilize a corresponding appropriate cutoff filter to achieve different wavelength selectivity.

Thus, according to some embodiments, the first and second sensors may respectively be tuned to be sensitive to two different wavelengths (or bands), for example, that are expected to be the two peak wavelengths of reflected light depending on whether or not a shear force or touch input is applied to the display.

According to another embodiment, the optical sensing array 504 may include a plurality of sensors that are sensitive to one wavelength (or band) that is shifted off peak (e.g., by a predetermined amount) to the reflected wavelength of light in a quiescent state (i.e., without any touch input on the display), such that the sensors are sensitive to detecting the change in reflected wavelength due to a touch input, as discussed above.

Figure 6:
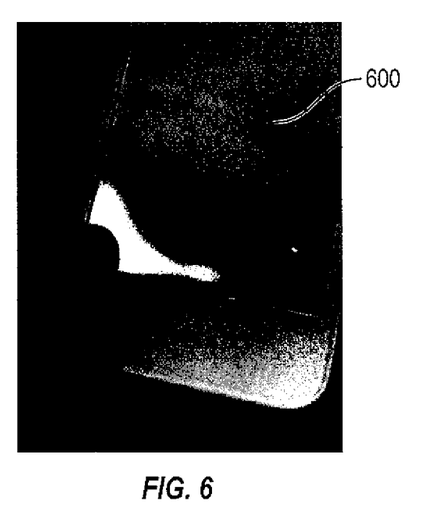
FIG. 6 illustrates an LCD device according to an embodiment of the present invention.

FIG. 6 illustrates an LCD device according to an embodiment of the present invention.

LCDs, due to the liquid nature of the electro-optic media, can flow when a force is applied. As such, a liquid crystal layer of a display device is a birefringent layer in and of itself. A shear force on an LCD generates a temporary gap change that is dependent on location, pressure, and the direction of the shear force. The gap change results in optical or light transmission change that is often visible even with naked eyes, as shown in FIG. 6. The wavelength selective optical sensing array embedded in a display device may be specifically sensitive to detect this pattern and determine the axis and the amplitude of the force direction. The change in appearance is temporary, as the liquid crystals have the ability to revert to their default orientation and position. The optical detectors, therefore, may have a relatively fast response time and the scanning rate of the detector array may be suitable to detect the changes in orientation and position of the liquid crystals. Accordingly, some embodiments of the present invention may be realized without a separate birefringent layer or with the birefringent layers but without significant deformation to the layers shown in FIGS. 5A and 5B, and may be implemented with just the liquid crystal display layer.

Referring to FIG. 6, an LCD device 600 is shown to react to a user's touch. At the point of contact, the display screen exhibits an optical change that is more pronounced near to the point of contact and less pronounced away from the point of contact. In particular, the LCD change at a point of contact is more pronounced in the direction of a shear force exerted by a user's finger. According to embodiments of present invention, the LCD device 600 may be engineered to include an optical sensing array that is capable of detecting these optical changes at the display, and be capable of interpreting the display changes to determine a user's shear force on the LCD device 600.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A display device comprising:
an optical sensing array to detect light;
a backlight to emit light toward a surface of the display device; and
a thin optical film layer at the surface of the display device, the thin optical film layer being configured to, while a first shear force is being applied at a first point of contact at the surface of the display device, reflect light having a first wavelength at a front area ahead of the first point of contact in a direction of the first shear force, and reflect light having a second wavelength at a back area behind the first point of contact opposite the front area, the first wavelength being different from the second wavelength, wherein a total reflection spectrum reflected by the front area is distinct from a total reflection spectrum reflected by the back area while the first shear force is being applied at the first point of contact.

2. The display device of claim 1, wherein the first and second wavelengths are spectral distributions corresponding to different bands of infrared light.

3. The display device of claim 1, wherein the thin optical film layer comprises a deformable surface adapted to thicken in the direction of the first shear force and thin in a direction opposite the direction of the first shear force.

4. The display device of claim 3, wherein the first wavelength is greater than the second wavelength.

5. The display device of claim 1, wherein the thin optical film layer comprises a photonic crystal layer adapted to compress in the direction of the first shear force and stretch in a direction opposite the direction of the first shear force.

6. The display device of claim 5, wherein the first wavelength is less than the second wavelength.

7. The display device of claim 5, wherein the first wavelength greater than the second wavelength.

8. The display device of claim 5, wherein the photonic crystal layer comprises a polymer with embedded voids.

9. The display device of claim 5, wherein the photonic crystal layer comprises polymer-based opals.

10. The display device of claim 1, wherein the display device is configured to measure the first shear force at the first point of contact concurrently with a second shear force at a second point of contact by detecting a first spectral shift of light reflected from the thin optical film layer at the first point of contact and a second spectral shift of light reflected from the thin optical film layer at the second point of contact.

11. A method for sensing a shear force at a surface of a display device comprising an optical sensing array to detect light, a backlight to emit light toward a surface of the display device, and a thin optical film layer at the surface of the display device, the method comprising:

detecting a first point of contact at the surface of the display device;

reflecting by the thin optical film layer, while a first shear force is being applied at the first point of contact at the surface of the display device, light having a first wavelength at a front area ahead of the first point of contact in a direction of the first shear force;

reflecting by the thin optical film layer, while the first shear force is being applied, light having a second wavelength at a back area behind the first point of contact opposite the front area, the second wavelength being different from the first wavelength, wherein a total reflection spectrum reflected by the front area is distinct from a total reflection spectrum reflected by the back area while the first shear force is being applied at the first point of contact; and sensing by the optical sensing array the reflected light having the first and second wavelengths.

12. The method of claim 11, wherein the first and second wavelengths are wavelengths corresponding to infrared light.

13. The method of claim 12, wherein the first wavelength is greater than the second wavelength.

14. The method of claim 11, wherein the thin optical film layer comprises a deformable surface adapted to thicken in the direction of the first shear force and thin in a direction opposite the direction of the first shear force, and an anti-reflective film on the deformable surface.

15. The method of claim 11, wherein the thin optical film layer comprises a photonic crystal layer adapted to compress in the direction of the first shear force and stretch in a direction opposite the direction of the first shear force.

16. The method of claim 15, wherein the photonic crystal layer comprises a polymer with embedded voids.

17. The method of claim 15, wherein the photonic crystal layer comprises polymer-based opals.

18. The method of claim 11, wherein the method further comprises:

measuring the first shear force at the first point of contact concurrently with a second shear force at a second point of contact by detecting a first spectral shift of light reflected from the thin optical film layer at the first point of contact and a second spectral shift of light reflected from the thin optical film layer at the second point of contact.

* * * * *